United States Patent
Bahri et al.

(10) Patent No.: US 6,647,316 B2
(45) Date of Patent: Nov. 11, 2003

(54) TRAFFIC MANAGEMENT SYSTEM AND METHOD FOR MATERIALS HANDLING USING TRAFFIC BALANCING AND TRAFFIC DENSITY

(75) Inventors: Namdar Bahri, Hopkinton, MA (US); Robert Gaskins, Littleton, MA (US); David Levassuer, Billerica, MA (US); Jing Wen Liu, Shrewsbury, MA (US); Thomas Mariano, Londonderry, NH (US); Ted Schnackertz, Tyngsboro, MA (US)

(73) Assignee: PRI Automation, Inc., Billerica, MA (US)

( * ) Notice: Subject to any disclaimer, the term of this patent is extended or adjusted under 35 U.S.C. 154(b) by 102 days.

(21) Appl. No.: 09/790,476

(22) Filed: Feb. 22, 2001

(65) Prior Publication Data

US 2002/0138172 A1 Sep. 26, 2002

(Under 37 CFR 1.47)

(51) Int. Cl.⁷ .................................................. G06F 7/00
(52) U.S. Cl. ........................ 700/217; 700/216; 700/213; 700/228; 700/229; 700/226
(58) Field of Search ................................. 700/217, 213, 700/226, 228, 229

(56) References Cited

U.S. PATENT DOCUMENTS

| | | | | |
|---|---|---|---|---|
| 4,766,547 A | | 8/1988 | Modery et al. ............. 364/478 |
| 4,827,395 A | * | 5/1989 | Anders et al. .............. 364/138 |
| 4,829,445 A | * | 5/1989 | Burney ....................... 364/478 |
| 4,950,118 A | * | 8/1990 | Mueller et al. ............. 414/274 |
| 5,239,739 A | * | 8/1993 | Akeel et al. ................. 29/430 |
| 5,272,805 A | * | 12/1993 | Akeel et al. ................. 29/712 |
| 5,341,130 A | * | 8/1994 | Yardley et al. ........ 340/825.06 |
| 5,399,531 A | * | 3/1995 | Wu ............................. 437/205 |
| 5,609,460 A | * | 3/1997 | Abel et al. ................... 313/334 |
| 5,672,039 A | * | 9/1997 | Perry et al. ................. 414/280 |
| 5,720,157 A | * | 2/1998 | Ross ............................. 53/445 |
| 5,880,443 A | * | 3/1999 | McDonald et al. ......... 235/375 |
| 5,976,199 A | * | 11/1999 | Wu et al. ................... 29/52.01 |
| 6,061,887 A | * | 5/2000 | Kawasaki et al. ........ 29/407.01 |
| 6,125,306 A | * | 9/2000 | Shimada et al. ............ 700/217 |
| 6,285,951 B1 | * | 9/2001 | Gaskins et al. ............. 701/209 |
| 2002/0161618 A1 | | 10/2002 | Weiss et al. .................... 705/8 |

OTHER PUBLICATIONS

Kato et al, "A Study on Pallet Transportation Problem," 50th National Converence of Information Processing Society, p. 1–383 to 1–384, 1995.*

Isao, Tsushima; Norihisa, Komoa; and Kenishi, Okasak: Knowledge Engineering Approach to Traffic Control for Automated Guided Vehicles, 1988, vol. 24 No. 3 pp300–307.*

(List continued on next page.)

Primary Examiner—Donald P. Walsh
Assistant Examiner—Michael E. Butler
(74) Attorney, Agent, or Firm—Weingarten, Schurgin, Gagnebin & Lebovici LLP (57) ABSTRACT

A traffic management system for an automatic material handling system (AMHS) divides time into a series of discrete time periods and analyzes a plurality of move requests that are to be executed within a particular time period is disclosed. The traffic management system receives a plurality of move requests from the AMHS and determines how many move requests are to be executed and selects which move requests in particular will be executed in the next time period. The traffic management system prioritizes the selected move requests by analyzing each source node and destination node contained in a move request in conjunction with other node traffic data. The traffic management system analyzes this data to ensure that a move request is not executed if a material transport vehicle would be dispatched to a node having a node traffic balance value that exceeds a predetermined value and a node traffic density value that exceeds a predetermined value.

16 Claims, 4 Drawing Sheets

OTHER PUBLICATIONS

Bahri, N;Gasklins, R.J., Automated material handling system traffic control by means of node balancing, Simulation conference proceedings 2000, pp 1344–1346, Dec. 2000.*

Imai et al., "A Study of the Short Period Planning for the Distribution of Empty Sea–Born Containers," Navigation Association of Japan; No. 81, pp. 1–8, May 1987.*

Kojima et al., "The Building of a Simulation System for Prediction of the Number of Necessary Pallets," pp. 98–102, 1991.*

Fukumra et al.,"Planning the Forwarding of Empty Containers Using a Mathematical Programming Method," RTRI Report, vol. 8 Nol. 2, pp. 39–44, Feb. 1994.*

* cited by examiner

TRAFFIC MANAGEMENT SYSTEM AND METHOD FOR MATERIALS HANDLING USING TRAFFIC BALANCING AND TRAFFIC DENSITY

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

This invention relates generally to a traffic management system for use in a network-like, vehicle-based, automated material handling system and in particular to a traffic management system that assigns priorities to jobs with a system and method that uses node traffic balancing and node traffic density values.

Electrically powered motor transport vehicles (MTVs) are often used in manufacturing and warehouse environments for transporting and manipulating articles of manufacture. Such vehicles are desirable in such environments due to their clean operation and low noise. Often such vehicles are propelled along a fixed rail or track, allowing precise control of movement along a predetermined path.

In particular, computer controlled materials transport systems are known for moving materials among various work stations of a facility. Such systems are employed, as an example, in semiconductor fabrication facilities for moving semiconductor wafers to successive work stations. In such a wafer transport system, a monorail track is routed past the work stations and a plurality of electric vehicles are mounted on the track and moveable therealong for delivering wafers to successive work stations and for removing wafers therefrom after requisite processing operations have been accomplished. The track is composed of interconnected track sections that usually include one or more routing sections or modules that are operative to provide plural paths along the track. In general a node is a location where a vehicle is stopped, loaded, unloaded, or redirected. Thus, a node can be a workstation that a vehicle must pass through or an intersection of one or more tracks where the vehicle may be redirected.

The vehicles on the track typically operate in a connected mode. In the connected mode of operation, a central controller, usually a computer, assigns destinations to vehicles and monitors the operation of the entire material handling system. This monitoring may include monitoring the status and location of each MTV, the status and location of material lots needed to be transported, and the status of each node of the material transport system.

The central controller is therefore responsible for the execution of move requests to transport a material lot from a source node to a destination node. In addition, the central controller is also responsible for the overall efficiency of the material transport system. For example, the more efficient use of the MTVs results in needing fewer of them, which reduces the cost of the overall system. In addition, by avoiding "traffic jams" at busy nodes the central controller may avoid a number of MTVs waiting in a queue for a pick-up or a delivery of a material lot. While waiting in a queue the MTV is being used inefficiently and the material transport system will experience longer delivery times.

Prior art systems provide a list of material lot move requests that are scheduled and prioritized by a first-in-first-out (FIFO) methodology. Each move request that is received includes a time-stamp associated with it that indicates when the move request originated. This method, however, allows move requests having a more recent time-stamp to be executed before a move request having a more stale time-stamp. This can result in an increase in delivery time and a decrease in the overall efficiency of the system. In addition, other problems may be caused by the use of a FIFO schedule/prioritizing scheme. For example, traffic jams occur at busy nodes resulting in an increased backlog of unexecuted move requests, longer delivery times, and MTVs waiting in queues to pick or drop off a lot.

Therefore, it would be desirable to provide a system and method that increases the efficient use of the MTVs, reduces the average delivery time of loads to stations, and reduces congestion at load/unload nodes.

BRIEF SUMMARY OF THE INVENTION

A system and method for prioritizing the execution of move requests in an automatic material handling system includes providing an ordered list of move requests to a material control system, wherein the ordered list includes a source node and a destination node. The material control system calculates a node traffic balance value and a node traffic density value for each source node and each destination node corresponding to each move request. The material control system searches the ordered list of move requests for the first move request having a source node and destination node that have a traffic balance value equal to a predetermined first traffic balance value and a traffic density value equal to a predetermined first traffic density value. The material control system assigns the first move request having these parameters a first priority value.

The material control system then searches the remaining move requests in the ordered list of move requests for a second move request having an associated source node and destination node that have a traffic balance value equal to a predetermined second traffic balance value and a traffic density value equal to a predetermined second traffic density value. The material control system assigns this second move request a second priority value.

The material control system searches the remaining move requests in the ordered list of move requests for a third move request having a source node that has a free car request value equal to a predetermined first free car request value. The material control system assigns the third move request a third priority value.

Additional aspects, features and advantages of the present invention are also described in the following Detailed Description.

BRIEF DESCRIPTION OF THE SEVERAL VIEWS OF THE DRAWING

The invention will be more fully understood by reference to the following Detailed Description of the Invention in conjunction with the drawings of which.

DETAILED DESCRIPTION OF THE INVENTION

Figure 1:
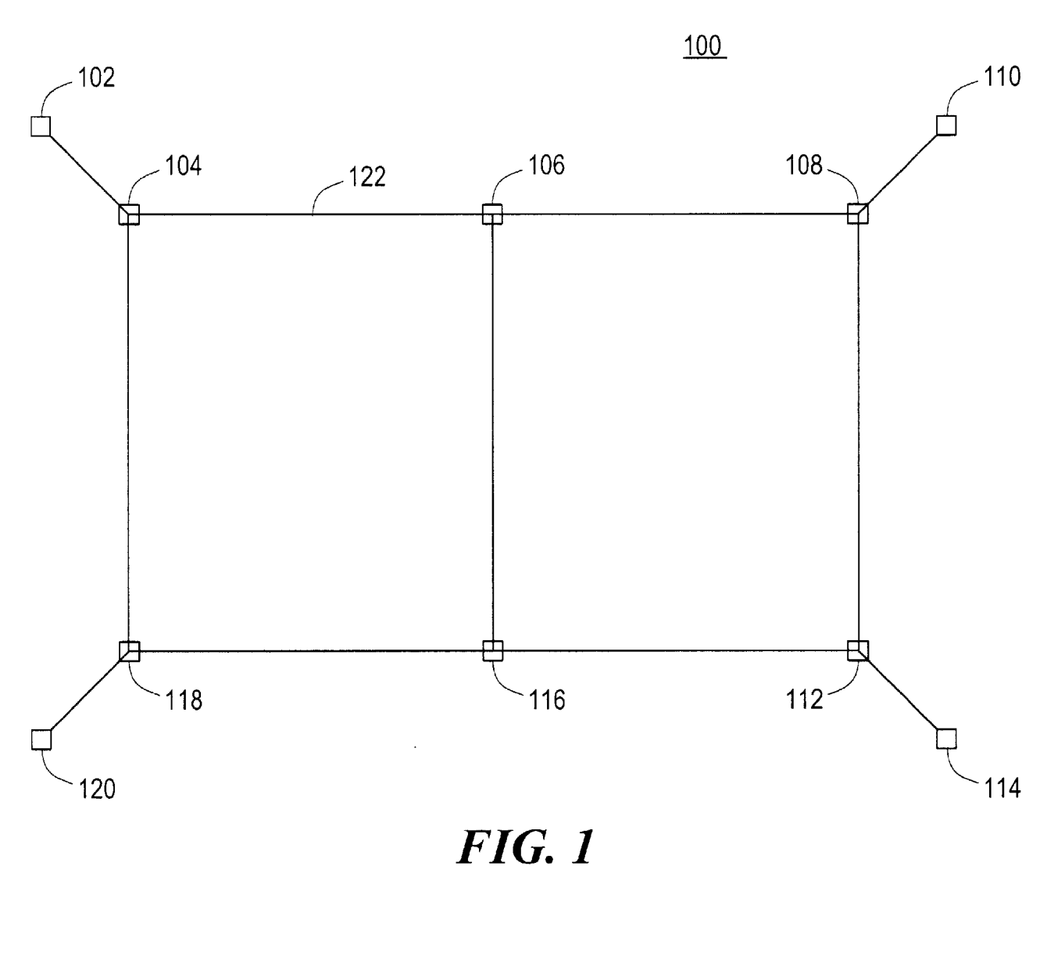
FIG. 1 is a schematic view of an exemplary topography of an automated material handling system.

A traffic management system, in accordance with the present invention, manages the motor transport vehicle (MTV) traffic in a material handling system by prioritizing received move requests based on calculated node traffic data. FIG. 1 illustrates an exemplary topology 100 of a material transport system (MTS) in which ten nodes are interconnected by a track 122. As illustrated in FIG. 1 for example, node 104 connects to nodes 102, 106, and 118. Also as illustrated in FIG. 1 multiple routes are available for a material transport vehicle (MTV) to use in retrieving material from a node or transporting material to another node. For example, to travel from node 102 to node 120 some of the possible paths are nodes 102-104-118-120; nodes 102-104-106-116-118-120; nodes 102-104-106-108-112-116-118-120.

As used herein a "move request" is a request from a node or other processing station that includes a source node, a destination node, and a time-stamp. As used herein a "source node" is a node or station that requests the traffic controller to dispatch a MTV thereto to pick up a material lot waiting to be transported to a destination node. The MTV retrieves the material lot and proceeds to the destination node. As used herein the "destination node" is the node or station that receives the MTV material lot delivery. The topology illustrated in FIG. 1 is an arbitrary topology intended to be for illustrative purposes only and in no way is meant to be limiting. A traffic management system (not shown) controls the distribution and delivery of materials, via the MTVs during a series of predetermined time periods.

The traffic management system divides time into a series of discrete time periods and analyzes a plurality of move requests to determine which move requests are to be executed within a particular time period. The traffic management system receives the plurality of move requests directly from the nodes or from an automated material handling system (AMHS). The traffic management system determines how many move requests are to be executed in the next time period and selects, in particular, the move requests that will be handled in the next time period. The traffic management system prioritizes the selected move requests to ensure that traffic congestion and delivery delays are kept to a minimum. To accomplish this, the traffic management system analyzes each source node and destination node contained in a move request in conjunction with other node traffic data. The traffic management system analyzes this data to prevent dispatching an MTV to a node having a node traffic balance value that exceeds a certain value and a node traffic density value that exceeds a certain value.

To determine the node traffic density value and node traffic balance, each node has a "to" and a "from" index that is used to determine the traffic balance and the traffic density for that node. The "from" index reflects the activity of the particular node as a source of material to be picked up and delivered to a destination node. The "from" index of the source node is incremented when a car is requested for a pick up at the source node, and the "from" index for the source node is decremented when the allocated car docks at the source node. The "to" index reflects the activity of that particular node as a destination node for material to be delivered from a source node. The "to" index for that particular node as a destination node is incremented when the allocated car is loaded at the source node, and the "to" index for that particular node as a destination node is decremented when the loaded car docks at the destination node. As used herein, for each particular node the traffic balance is given by:

$$TB_k = \sum_i to_i - \sum_j from_j.$$

Where k is the $k^{th}$ node, i is the index of move requests listing the $k^{th}$ node as a source node and j is the index of move requests listing the $k^{th}$ node as a destination node. Similarly, for each particular node the traffic density is given by:

$$TD_k = \sum_i to_i + \sum_j from_j.$$

Where k is the $k^{th}$ node, i is the index of move requests listing the $k^{th}$ node as a source node and j is the index of move requests listing the $k^{th}$ node as a destination node.

Figure 2:
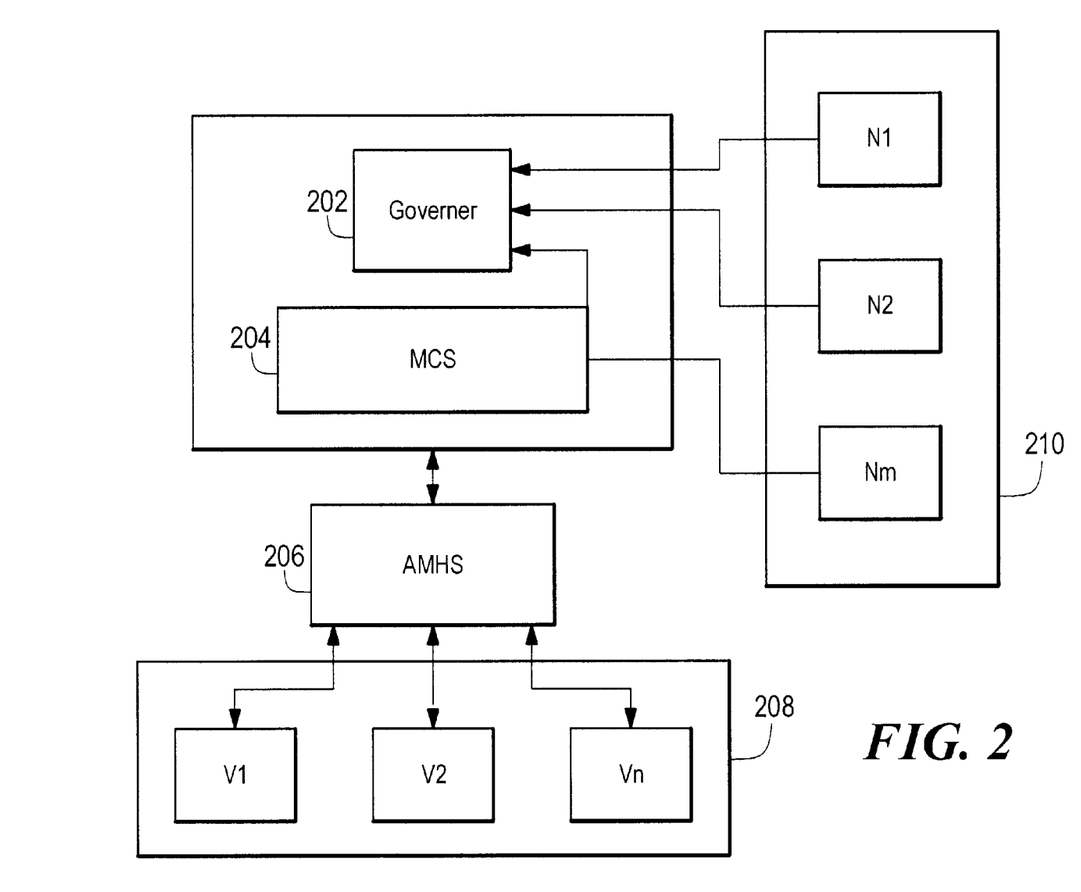
FIG. 2 is a block diagram of a traffic management system in accordance with the present invention.

FIG. 2 illustrates a traffic management system 200 using node traffic balance values and node traffic density values to determine the prioritization of received move requests. A method illustrating the steps discussed below is provided in FIGS. 3A and 3B. In particular, a governor 202 receives a plurality of move requests from one or more nodes 210, or the AMHS 206, and determines the number of move requests that are to be executed during the next time period. The governor 202 determines the number of move requests to be executed as a function of the number of move requests that were to be executed in the previous time period and the number of those move requests that remain unexecuted from the previous time period. The governor 202 then ranks the received move requests in some manner to create an ordered list of move requests. This ranking may be accomplished according to a first-in-first-out (FIFO) ranking, according to a "hot lot" designation by an operator, or according to a schedule based upon the processing stages involved. A "hot lot" is a move request that is a time critical pick up or delivery that is needed at a node or a stage to avoid interrupting the ongoing processing.

The governor 202 provides to the material control system (MCS) 204 both the number of move requests to be executed and the ordered list of move requests to be executed in the next time period. In one embodiment, the governor 202 may be a part of the MCS. As will be explained below, the MCS 204 prioritizes the received move requests according to the calculated node traffic balance values and the node traffic density values for each source node and destination node contained in the ordered list. By restricting the dispatching of MTVs to nodes that meet certain node traffic requirements, the MCS 204 ensures that the number of late lots is reduced, the efficiency of the usage of the MTVs is increased, and the delivery time does not increase.

Figure 3A:
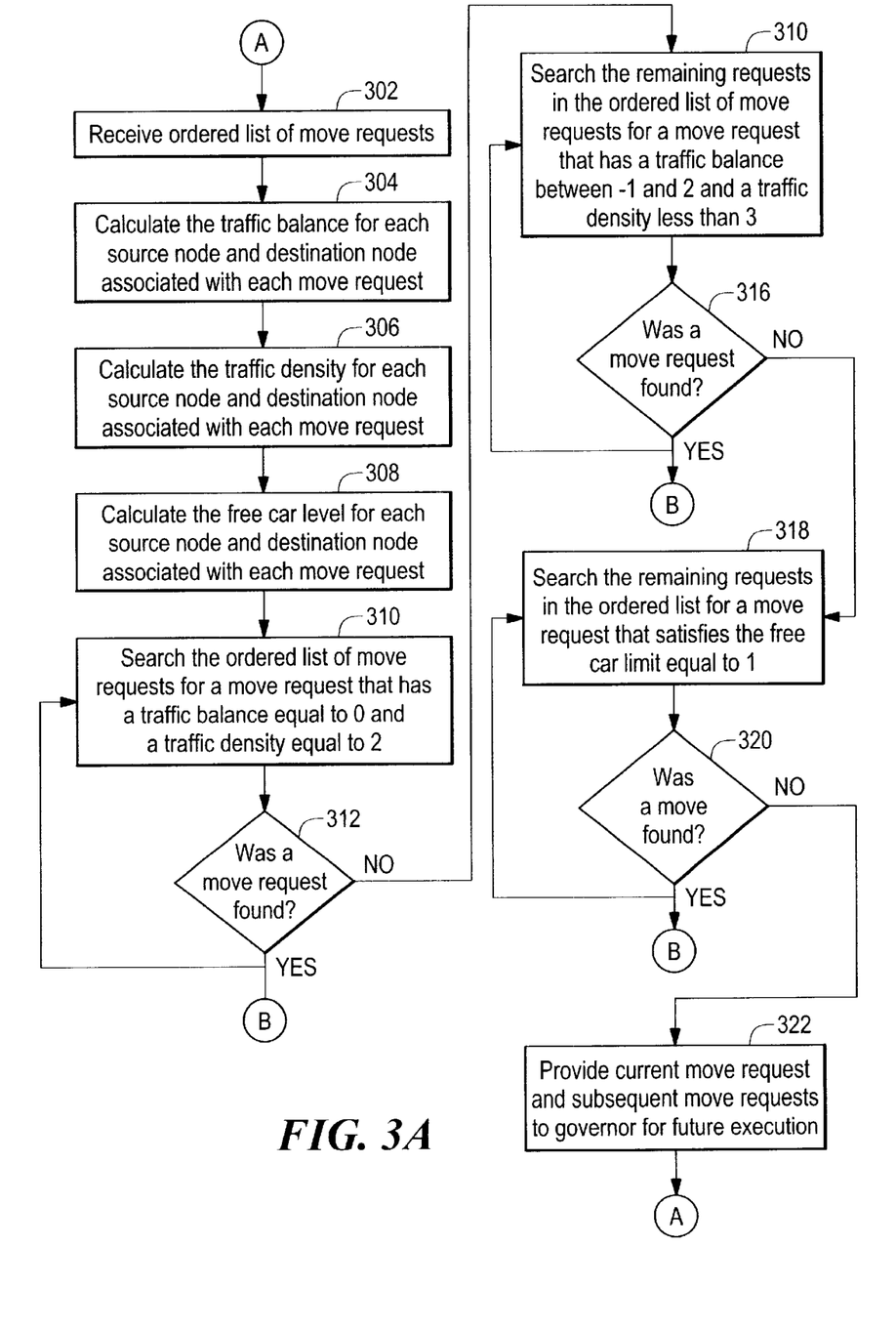
FIGS. 3A and 3B are a flow chart illustrating a method of traffic management in accordance with the present invention.
Figure 3B:
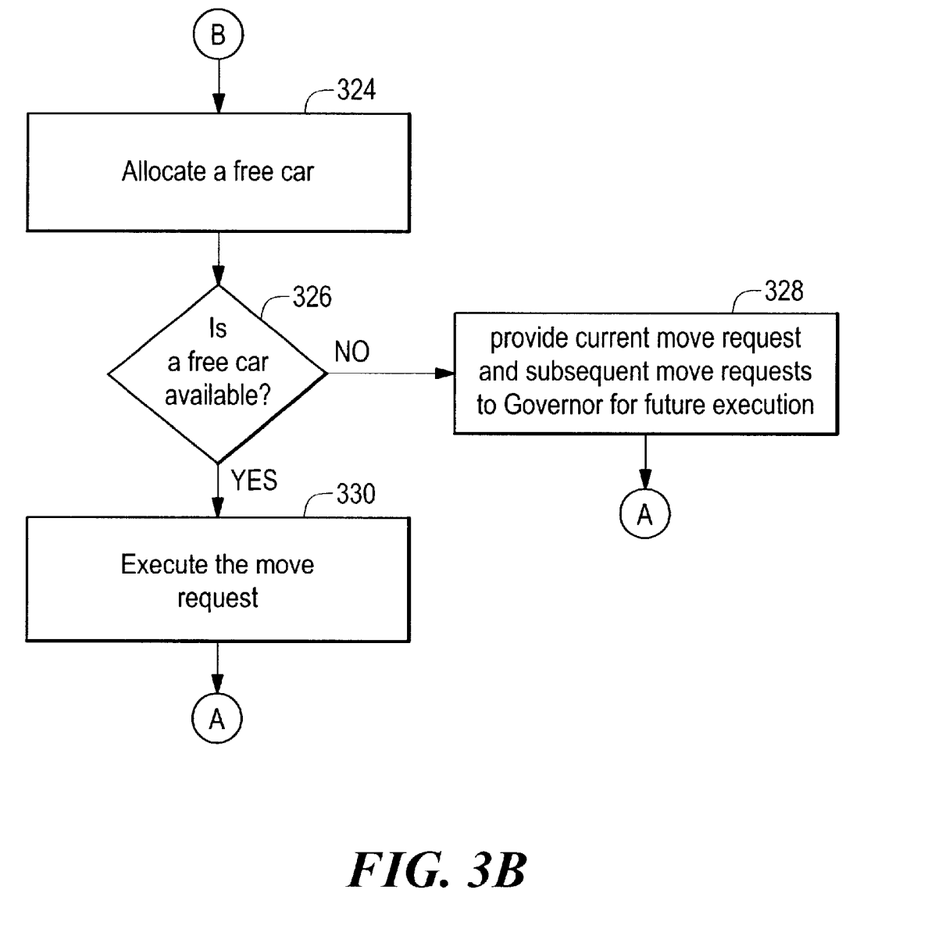

In particular, in a first pass shown in FIG. 3A as steps 302–312, the MCS 204 will search the ordered list of move requests, in order, for any move requests that have both a node traffic balance value of zero (0) for both the source and destination nodes, and a node traffic density value less than or equal to two (2) for both the source and destination nodes. The MCS 204 will select these move requests in order of their ranking such that a subsequent selected move request will not be of a higher rank than any previously selected move request. Each move request selected by the MCS 204 according to the above criteria is forward to the automated material handling system (AMHS) 206 that controls the operation of the MTVs 208.

The AMHS 206 determines if any MTVs 208 are available, i.e., if any MTVs 208 are un-dispatched or free. If a MTV 208 is available, the AMHS (206) selects the MTV 208 and dispatches it to the source node indicated in the currently executing move request to pickup the material lot contained there. The AMHS 206 informs the MCS 204 that a MTV 208 is available and the MCS 204 then continues to search the ordered list for more move requests satisfying the above criteria. If there are no MTVs 208 that are free at the time the move request is to be executed, the AMHS informs the MCS 204. The MCS 204 then provides the current unexecuted move request and all remaining unexecuted move requests to the governor 202. The governor 202 will add the unexecuted move requests to the list of unexecuted move requests that are to be processed in the next time period. The MCS 204 then stops searching and executing the ordered list of move requests for the remaining time of the current time period as illustrated in steps 324–328 depicted in FIG. 3B.

When all the requests in the first pass have been processed and if more time remains, if any move requests in the ordered list remain unexecuted the MCS 204 searches the remaining move requests contained within the ordered list for any move requests having a traffic balance between negative two (−2) and two (2) for both the source and destination nodes and a traffic density of three (3) or less for both the source and the destination nodes. In one preferred embodiment, the traffic balance is between negative one (−1) and two (2). Each move request selected by the MCS 204 according to the above criteria is forward to the automated material handling system (AMHS) 206.

The AMHS 206 determines if there are any available MTV's, i.e., if any MTV's are un-dispatched, or free. If a MTV 208 is available, the AMHS (206) selects the MTV 208 and dispatches it to the source node of the currently executing move request currently being executed to pick-up the material lot contained there. The AMHS 206 informs the MCS 204 that a MTV 208 is available and the MCS 204 then continues to search the ordered list for more move requests satisfying the above criteria. If there are no MTVs 208 that are free at the time the move request is to be executed, the AMHS informs the MCS 204. The MCS 204 then provides the current unexecuted move request and all remaining unexecuted move requests to the governor 202. The governor 202 will add the unexecuted move requests to the list of unexecuted move requests that are to be processed in the next time period. The MCS 204 then stops searching and executing the ordered list of move requests for the remaining time of the current time period.

When all the requests in the second pass have been processed and if more time remains, if any move requests in the ordered list remain unexecuted, the MCS 204 executes a third pass illustrated in steps 318–322 in FIG. 3A. In the third pass, the MCS 204 will execute any remaining move requests that satisfy a free car limit of one (1). The free car limit is defined as the maximum number of free MTVs that can be currently dispatched to any particular node. The automated material handling system (AMHS) 206 controls the cars and maintains an index of free cars and in-use cars. The MCS 204 will therefore execute the number of move requests that remain, after the first two passes are complete, that correspond to the number of un-dispatched cars remaining in the automated material handling system (AMHS) 206. Each move request selected by the MCS 204 according to the above criteria is forward to the automated material handling system (AMHS) 206.

The AMHS 206 determines if there are any available MTVs. If a MTV 208 is available, the AMHS (206) selects the MTV 208 and dispatches the available MTV to the source node of the move request currently being executed to pickup the material lot contained there. The AMHS 206 informs the MCS 204 that a MTV 208 is available and the MCS 204 then continues to search the ordered list for more move requests satisfying the above criteria. If there are no MTVs 208 that are free at the time the move request is to be executed, the AMHS informs the MCS 204. The MCS 204 then provides the current unexecuted move request and all remaining unexecuted move requests to the governor 202. The governor 202 will add the unexecuted move requests to the list of unexecuted move requests that are to be processed in the next time period. The MCS 204 then stops searching and executing the ordered list of move requests for the remaining time of the current time period.

Any move requests remaining after the completing of the above three passes will be provided to the governor 202 as being unexecuted during the current time period. The governor 202 will then include the unexecuted move requests in the list of unexecuted move requests that are to be processed in the next time period.

In another embodiment, batching may be used when assigning MTVs to execute particular move requests. Batching involves the use of a number of separate MTVs to move connected material lots to the next processing station in the processing sequence. In this manner, the material lots may be assigned by the MCS and transported together from one processing section to another. However, batching can limit the availability of MTVs because the MCS can not assign batched MTVs to perform other functions.

Those of ordinary skill in the art should further appreciate that variations to and modification of the above-described methods and apparatus for traffic management may be made without departing from the inventive concepts disclosed herein. Accordingly, the invention should be viewed as limited solely by the scope and spirit of the appended claims.

What is claimed is:

1. A method for prioritizing vehicle movements in an automatic material handling system, the method comprising:
   providing an ordered list of move requests, the ordered list including a source node and a destination node associated with each move request;
   calculating a traffic balance value for each source node and for each destination node for each move request;
   calculating a traffic density value for each source node and for each destination node for each move request;
   calculating a free car limit value for each source node and for each destination node for each move request;
   searching said ordered list of move requests for a first move request having an associated source node and destination node each having said traffic balance value equal to a first traffic balance value and said traffic density value equal to a first traffic density value; and
   assigning said first move request a first priority value.

2. The method of claim 1 wherein said first traffic balance value is 0.

3. The method of claim 1 wherein said first traffic density value is 2.

4. The method of claim 1 further comprising the steps of:
   searching said ordered list of move requests for a second move request having an associated source node and destination node having said traffic balance value equal to a second traffic balance value and said traffic density value equal to a second traffic density value; and
   assigning said second move request a second priority value.

5. The method of claim 4 wherein said second traffic balance value is between −2 and 2.

6. The method of claim 5 wherein said second traffic balance value is between −1 and 2.

7. The method of claim 1 further comprising the steps of:
searching said ordered list of move requests for a third move request having a source node having said free car limit value equal to a first free car limit value; and
assigning said third move request a third priority value.

8. The method of claim 7 wherein said second traffic density value is less than 3.

9. The method of claim 7 wherein said free car limit value is 1.

10. A method for prioritizing vehicle movements in an automatic material handling system, the method comprising:
providing an ordered list of move requests, the ordered list including a source node and a destination node associated with each move request;
calculating a traffic balance value for each source node and for each destination node for each move request;
calculating a traffic density value for each source node and for each destination node for each move request;
calculating a free car limit value for each source node and for each destination node for each move request;
searching said ordered list of move requests for a first move request having an associated source node and destination node each having said traffic balance value equal to a first traffic balance value and said traffic density value equal to a first traffic density value;
assigning said first move request a first priority value;
searching said ordered list of move requests for a second move request having an associated source node and destination node having said traffic balance value equal a second traffic balance value and said traffic density value equal to a second traffic density value;
assigning said second move request a second priority value;
searching said ordered list of move requests for a third move request having a source node having said free car limit value equal to a first free car limit value; and
assigning said third move request a third priority value.

11. The method of claim 10 wherein said first traffic balance value is 0.

12. The method of claim 10 wherein said first traffic density value is 2.

13. The method of claim 10 wherein said second traffic balance value is between −2 and 2.

14. The method of claim 13 wherein said second traffic balance value is between −1 and 2.

15. The method of claim 10 wherein said second traffic density value is less than 3.

16. The method of claim 10 wherein said free car limit value is 1.

* * * * *

UNITED STATES PATENT AND TRADEMARK OFFICE
CERTIFICATE OF CORRECTION

PATENT NO. : 6,647,316 B2
DATED : November 11, 2003
INVENTOR(S) : Bahri et al.

It is certified that error appears in the above-identified patent and that said Letters Patent is hereby corrected as shown below:

<u>Title page,</u>
Item [*] Notice, delete the phrase "by 102 days" and insert -- by 149 days --

Signed and Sealed this

Eleventh Day of January, 2005

JON W. DUDAS
*Director of the United States Patent and Trademark Office*